US008166312B2

(12) United States Patent
Waldmann

(10) Patent No.: US 8,166,312 B2
(45) Date of Patent: Apr. 24, 2012

(54) METHOD OF INDIVIDUALLY FITTING A HEARING DEVICE OR HEARING AID

(75) Inventor: Bernd Waldmann, Maur (CH)

(73) Assignee: Phonak AG, Stafa (CH)

( * ) Notice: Subject to any disclaimer, the term of this patent is extended or adjusted under 35 U.S.C. 154(b) by 249 days.

(21) Appl. No.: 12/676,412

(22) PCT Filed: Sep. 5, 2007

(86) PCT No.: PCT/EP2007/059279
§ 371 (c)(1),
(2), (4) Date: Mar. 4, 2010

(87) PCT Pub. No.: WO2007/144435
PCT Pub. Date: Dec. 21, 2007

(65) Prior Publication Data

US 2010/0205447 A1 Aug. 12, 2010

(51) Int. Cl.
*G06F 11/30* (2006.01)

(52) U.S. Cl. ........................................ 713/189; 381/312

(58) Field of Classification Search .................. 713/189, 713/193; 726/26, 28, 29; 381/312, 314; 707/781, E17.005
See application file for complete search history.

(56) References Cited

U.S. PATENT DOCUMENTS

| | | | | |
|---|---|---|---|---|
| 6,724,862 | B1 * | 4/2004 | Shaffer et al. | 379/52 |
| 7,174,017 | B2 * | 2/2007 | Bantz et al. | 380/255 |
| 2002/0054689 | A1 | 5/2002 | Zhang et al. | |
| 2004/0071304 | A1 * | 4/2004 | Yanz et al. | 381/312 |
| 2005/0078845 | A1 * | 4/2005 | Aschoff et al. | 381/322 |
| 2006/0204013 | A1 * | 9/2006 | Hannibal et al. | 381/60 |
| 2006/0227987 | A1 * | 10/2006 | Hasler | 381/314 |
| 2009/0010463 | A1 * | 1/2009 | Boretzki et al. | 381/312 |

FOREIGN PATENT DOCUMENTS

| | | | |
|---|---|---|---|
| EP | 1320279 | A1 | 6/2003 |
| WO | 0115043 | A1 | 3/2001 |
| WO | 2005003902 | A2 | 1/2005 |
| WO | 2005125281 | A1 | 12/2005 |
| WO | 2006058453 | A2 | 6/2006 |

OTHER PUBLICATIONS

International Search Report for PCT/EP2007/059279 dated Jun. 19, 2008.
Written Opinion for PCT/EP2007/059279 dated Jun. 19, 2008.

* cited by examiner

*Primary Examiner* — Beemnet Dada
(74) *Attorney, Agent, or Firm* — Pearne & Gordon LLP

(57) ABSTRACT

The present invention provides a method of providing parameters for the fitting process of individually shaped or customized hearing devices by collecting and storing fitting parameters during a fitting process by a local fitting computer; generating an individual encryption key related to the hearing device; sending the stored fitting parameters encrypted with the encryption key to a remote database; storing the encryption key in the memory of the hearing device; reading out the encryption key from the hearing device; reading out data from the remote database using the encryption. Thus, the privacy of the individual fitting data of a hearing device is secured.

5 Claims, 1 Drawing Sheet

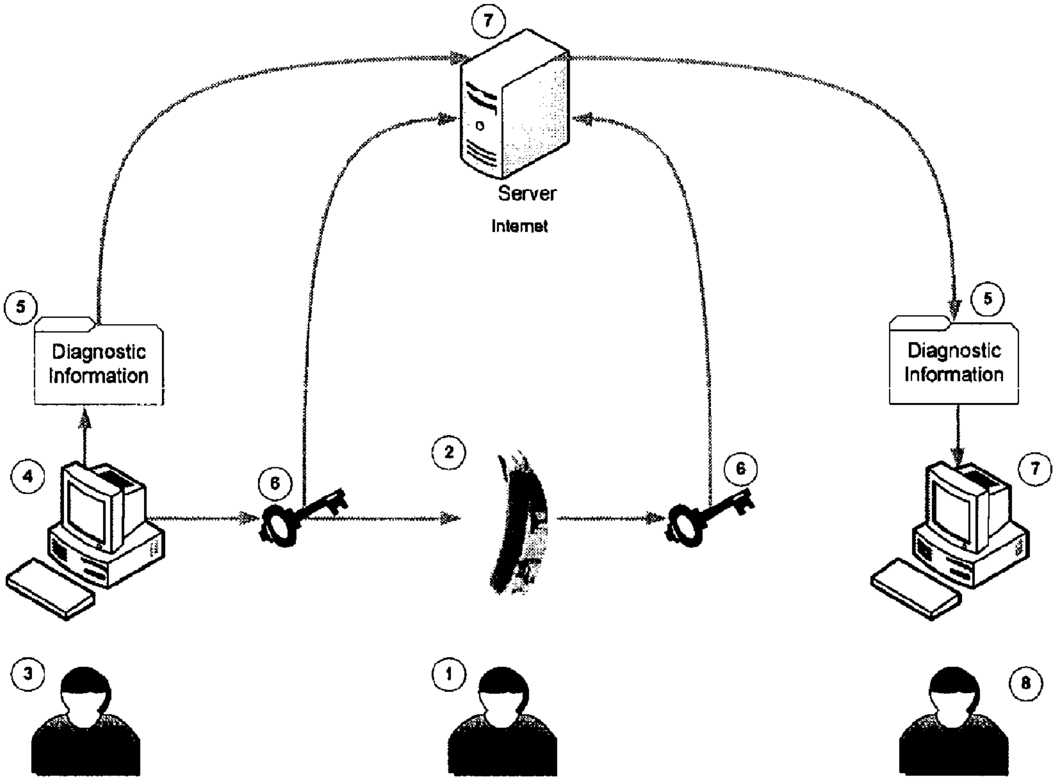
7
Server
Internet
5
Diagnostic Information
5
Diagnostic Information
4
6
2
6
7
3
1
8

METHOD OF INDIVIDUALLY FITTING A HEARING DEVICE OR HEARING AID

TECHNICAL FIELD OF THE INVENTION

This invention relates to a method of providing parameters for the fitting process of individually shaped or customized hearing devices.

BACKGROUND OF THE INVENTION

For a first or continuous fitting of hearing devices, such as individually customized behind the ear or in-the-ear hearing aids of a user of the hearing device, the process comprises the steps of retrieving and storing data about diagnostic information about the user's hearing loss, information about the user's preferences and previous experience with hearing amplification, choosing one of several known formulas for deriving an initial gain setting based on the information above, the acoustic coupling of the user's ear and individual demands and eventually complaints from the user with regard to particular listing situations. These data will serve as input parameters for the fitting process. During the fitting process, the parameters will then have to be adjusted by using the mentioned parameters to reach the desired result.

This fitting process is regularly made by a hearing professional who has access to said parameters. If the user has to change the hearing professional, the new hearing professional has to recreate the current fitting adjustments or fitting parameters of the hearing device.

In known hearing devices those fitting parameters are stored in non-volatile memory inside the hearing aid itself that may be read out by the hearing professionals by a fitting interface. The data may then be used within a fitting software usually provided by the manufacturer of the hearing device. The amount of memory needed to store such information is typically very high and is thus undesirable with respect to the limited amount of memory typically available in hearing devices. An extension of the memory of hearing devices is expensive and occupies the restricted volume of the usually miniaturized hearing device. It is thus desirable to limit the amount of memory required by the hearing device for all its functionality.

One known solution for saving memory amount within the hearing device is to store information or data on an external storage medium. If this external storage medium has to be handled by the user of the hearing device, the risk of failure due to a loss of this storage device or a faulty manipulation of the external storage is very high.

WO 2005/125281 and WO 2005/003902 are describing systems for storing and retrieving data in a remote database system. Thus, the amount of memory needed by those data may be saved in the internal memory of the hearing device. On the other hand, the data on the centralized database system are not secured and may eventually be used by any person interested in such data. For a user of a hearing device, it is regularly undesirable to have stored its private data on a centralized database system with uncontrolled access to those data.

It is thus an object of the present invention to provide a method for providing a secure and complete set of data of individual fitting parameters for performing the fitting process for a hearing device.

SUMMARY OF THE INVENTION

The present invention provides a method of providing parameters for the fitting process of individually shaped or customized hearing devices by collecting and storing fitting parameters during a fitting process by a local fitting computer; generating an individual encryption key related to the hearing device; sending the stored fitting parameters encrypted with the encryption key to a remote database; storing the encryption key in the memory of the hearing device; reading out the encryption key from the hearing device; reading out data from the remote database using the encryption key for a further fitting process of the hearing device.

To have access to the stored fitting data on a remote database for a further fitting process, this access is only possible with access to the encryption key stored within the hearing device itself. Thus, it is only possible to access those data if an access to the hearing device itself is present. This is only the case for a hearing professional if he receives the hearing device by the user itself, thus the privacy of the data of the user stored on the remote database is secured. Furthermore, a changing of the hearing professional is possible, as a new hearing professional with access to the remote database will have access to the actual fitting data by using the encryption key of the proper hearing device. Without the hearing device, the old hearing professional will no longer have access to the fitting data, thus the privacy of such fitting data is secured.

In one embodiment the remote database is a shared data storage, located at one or more locations, accessible via online connections from any other location. By providing a centralized data storage the storage capacity of this device may dynamically grow with the number of hearing devices and the amount of data to be stored. It is clear, that the centralized data storage may itself be a storage cluster with distributed shared storage devices, located at one location or at several different locations. As the data storage is accessible anytime from any location, all data generated in connection with the fitting process may already be entered into the data storage and is thus instantly available for any following fitting process at any location, provided that the encryption code stored in the hearing device is present.

In another embodiment, the connection will be established via the Internet. The accessibility of the data in the data storage via an Internet connection allows a quick and simple transfer of those data without the need of specialized connection means only for the purpose of fitting the hearing device. By using encryption the privacy of the data is always ensured.

In a further embodiment, the encryption key is an electronic encryption key or a password. A password may be used especially for low-critical appliances with respect of privacy.

In a further embodiment, at least one of the following geometry data is stored:

- diagnostic information about the hearing loss of the user of the hearing device;
- information about the users preferences with hearing amplification;
- information about the previous experiences with hearing amplification;
- acoustic coupling of the ear of the user of the hearing device;
- individual demands or complaints of the user of the hearing device with regard to the particular listening situation.

With such data available to the hearing professional performing the fitting process, it is possible to obtain a simplified model to achieve a good approximation of the acoustic properties of the customized hearing device and to start the fitting process with nearly optimal parameters which only need minor modification during the final fitting process.

It is pointed out that the present invention not only applies to hearing devices such as behind the ear or in the ear canal hearing aids for the compensation or correction of a hearing impairment. The present invention may be applied as well for any hearing device used to improve communication.

BRIEF DESCRIPTION OF THE DRAWINGS

For the purpose of facilitating and understanding of the invention, there is illustrated in the accompanying drawing a preferred embodiment thereof to be considered in connection with the following description. Thus the invention may be readily understood and appreciated by the only FIGURE showing schematically a process view of one embodiment of the inventive method.

DESCRIPTION OF EMBODIMENTS OF THE INVENTION

Referring to the only FIGURE, the process of storing and retrieving data for the fitting process of an individually shaped or customized hearing device will be described.

A user 1 is wearing a hearing device 2, i.e. a behind-the-ear hearing device. It is clear for the person skilled in the art that any other type of hearing device 2 may be used as well.

A first hearing professional 3 is performing the fitting process of the hearing device 2 by use of a computer 4 with a computer program provided by the hearing device manufacturer. The individual set of information 5 of user 1 collected and developed by the hearing professional 3 such as hearing loss, preferences and settings of the hearing device 2 will be stored in a database of a remote server 7. The access to those data is controlled by encryption with an encryption key 6. In one embodiment, this encryption key 6 is stored within the non-volatile memory of hearing device 2.

The encryption key 6 is unique and associated only to the hearing device 2. Therefore, it is only possible to access the specific data of hearing device 2 by use of this encryption key 6 and thus under the control of the user 1 of hearing device 2.

The encryption key 6 may consist of an electronic encryption key or a password or other unique authentication means.

For performing any subsequent fitting process, the individual set of information 5 corresponding to the hearing device 2 stored in the database of the remote server 7 may be retrieved again by a second hearing professional 8 by use of his computer 7. To read out properly those data, the encryption key 6, stored in or associated to the hearing device 2 has to be used. Therefore, the privacy of the individual set of information 5 is secured.

The second hearing professional 8 may be the same person as the first hearing professional 3 or may be another person. Thus, the user 1 may freely decide to change the assistance for fitting his hearing device 2 without the risk of loosing the fitting data of his hearing device 2 or without the risk of loosing the privacy of his individual data.

In one embodiment of the invention, this remote server 7 is a remote shared data storage, located i.e. at the hearing device manufacturing location. This data storage is advantageously online accessible from all different locations where the fitting process takes place. This access may for instance be provided via direct Internet access to this data storage. One of the great advantages of such a data storage is in fact its practically unlimited storage capacity. As the centralized data storage does not have to be moved together with the hearing device 2, it is not limited by weight or shape and may be designed to dynamically grow with the needs of storage capacity. It is thus possible to store the complete fitting parameters and data of the hearing device 2 for each individual user 1.

For the fitting process, all of those stored data may preliminary be used for a complete simulation of the acoustical performance of the hearing device 2 under operational conditions, i.e. when inserted into the user's 1 ear canal and thus an intelligent pre-calculation of optimal hearing device settings may be performed prior to the final fitting process. For instance, vent shape such as cross section, length and curvature, vent microphone distances, shell thickness, estimated residual volume between the hearing device and the tympanic membrane are such geometry information that can be used for the fitting process. Also other parameters determined during a fitting process and stored in the data storage may used if of relevant influence with respect to the optimal acoustic performance of the hearing device 2.

A method for recording of information in a hearing aid is published in EP 1 414 271. This method may be used for the technical process of storing the information described above either in the hearing aid memory or in a centralized or shared storage.

Thus, the present invention provides a method to improve the security of the individual fitting data, as data collected through the whole process of fitting of a hearing device 2 are used preliminary and/or during the fitting of the hearing device 2 at the hearing professional's office only under control of the unique encryption key 6 of the specific hearing device 2. As it is currently not possible to store such data completely within the memory of the hearing device 2, the use of a secure remote shared data storage device is of great advantage.

The invention claimed is:

1. Method of providing parameters for the fitting process of individually shaped or customized hearing devices (2) by collecting and storing fitting parameters during a fitting process by a local fitting computer (4);

generating an individual encryption key (6) related to the hearing device (2);

sending the stored fitting parameters encrypted with the encryption key (6) to a remote database (7);

storing the encryption key (6) in the memory of the hearing device (2);

reading out the encryption key (6) from the hearing device (2);

reading out data from the remote database (7) using the encryption key (6) for a further fitting process of the hearing device (2).

2. The method of claim 1, wherein the remote database (7) is a shared data storage, located at one or more locations, accessible via online connections from any other location.

3. The method of claim 2, wherein the connection will be established via the Internet.

4. The method of claim 1, wherein the encryption key (6) is an electronic encryption key or a password.

5. The method of claim 1, wherein at least one of the following parameters is stored:

diagnostic information about the hearing loss of the user of the hearing device;

information about the users preferences with hearing amplification;

information about the previous experiences with hearing amplification;

acoustic coupling of the ear of the user of the hearing device;

individual demands or complaints of the user of the hearing device with regard to the particular listening situation.

* * * * *